United States Patent
Suggula et al.

(10) Patent No.: US 10,497,066 B2
(45) Date of Patent: Dec. 3, 2019

(54) SYSTEM AND METHODS FOR CREATING AND USING REVENUE ARRANGEMENTS FOR EFFICIENT REVENUE MANAGEMENT

(71) Applicant: NETSUITE INC., San Mateo, CA (US)

(72) Inventors: Mohana Murali Suggula, Cupertino, CA (US); Brian Alexander Purville, San Francisco, CA (US); Michael (Xiaozheng) Ye, Foster City, CA (US); John Edward Peacock, Redwood City, CA (US)

(73) Assignee: NETSUITE INC., San Mateo, CA (US)

( * ) Notice: Subject to any disclaimer, the term of this patent is extended or adjusted under 35 U.S.C. 154(b) by 562 days.

(21) Appl. No.: 15/140,150

(22) Filed: Apr. 27, 2016

(65) Prior Publication Data

US 2017/0236217 A1    Aug. 17, 2017

Related U.S. Application Data

(60) Provisional application No. 62/155,376, filed on Apr. 30, 2015.

(51) Int. Cl.
*G06Q 40/00* (2012.01)
*G06Q 30/04* (2012.01)

(52) U.S. Cl.
CPC ............ *G06Q 40/12* (2013.12); *G06Q 30/04* (2013.01)

(58) Field of Classification Search
None
See application file for complete search history.

(56) References Cited

U.S. PATENT DOCUMENTS

| | | | |
|---|---|---|---|
| 9,817,991 B2 | 11/2017 | Boncha et al. | |
| 9,892,467 B2 | 2/2018 | Shak et al. | |
| 2002/0178077 A1* | 11/2002 | Katz | G06Q 10/0637 705/7.36 |
| 2017/0236084 A1 | 8/2017 | Sullivan et al. | |
| 2017/0236213 A1 | 8/2017 | Shak et al. | |
| 2017/0236214 A1 | 8/2017 | Wang et al. | |

* cited by examiner

*Primary Examiner* — Fateh M Obaid
(74) *Attorney, Agent, or Firm* — Kraguljac Law Group, LLC

(57) ABSTRACT

Systems, apparatuses, and methods for establishing a revenue arrangement mechanism for creating and handling revenue arrangements designed to allocate revenue according to accounting rules and procedures for managing revenue. These aspects of a revenue arrangement enable a business to more flexibly and accurately manage and recognize revenue in a manner that complies with applicable accounting regulations and rules. In some embodiments, the methods and systems may be implemented as part of a business data processing platform that is used in conjunction with ERP, eCommerce, and/or CRM data as part of a multi-tenant system for providing order management and order processing services to one or more businesses. Such a platform may also be responsible for accessing and processing revenue, profit, inventory, sales, and other data in order to generate financial metrics that characterize the business (es) and their operations.

17 Claims, 7 Drawing Sheets

SYSTEM AND METHODS FOR CREATING AND USING REVENUE ARRANGEMENTS FOR EFFICIENT REVENUE MANAGEMENT

PRIORITY CLAIM

This application claims the benefit of U.S. Provisional Application No. 62/155,376, entitled "System and Methods for Creating and Using Revenue Arrangements for Efficient Revenue Management," filed Apr. 30, 2015, which is incorporated by reference in its entirety herein for all purposes.

BACKGROUND

Operating a business involves ensuring compliance with various regulations and disclosure requirements within various jurisdictions. These requirements may relate to providing accurate information regarding certain financial aspects of the operations of the business, and are also often bolstered by accounting, taxation, securities, and/or other financial disclosure requirements. One specific requirement of these financial disclosure requirements involves the appropriate timing of revenue recognition, as this may impact business valuations, profit margins, debt levels, and the like.

Recognizing revenue may take on various forms depending on the nature of the underlying financial transaction and/or service/goods provision. Thus, various revenue arrangements may be realized depending on the nature of the various underlying transactions. Revenue arrangement is a functional relationship that deals with how revenue is recognized in various types of business transactions. For example, in some cases, splitting a single sale from a customer into multiple sales depending upon the number or types of items from the original SO that have been fulfilled may provide a way to more efficiently track the processing of the order. In other cases, multiple sales (from a single customer) may need to be merged to correctly recognize/allocate/arrange the revenue generated from a related set of orders or a specific task or project, or to correctly update financial data. In still other cases, if the revenue allocation/arrangement may be "insignificantly different", then the system may be configured to automate the revenue arrangement a certain way, without requiring a manual approval process (where "insignificantly different" may be defined as a % value of the revenue.

Revenue recognition regulations/standards define/outline what portions/aspects of revenue can be recognized and under what conditions. The timing of revenue recognition is nontrivial, in that a "deliverable" or performance obligation for an order can be an item fulfillment, completion of a milestone, support, or anything else related to a service that will be provided to a customer (and either directly or indirectly). Applications and data stored on a multi-tenant business data processing platform (and the way in which they are structured and interact) offer an opportunity to tie a trackable event to a revenue element, and as a result, to trigger commencement of amortization or another revenue recognition operation. Such tracking, however, is labor-intensive, cumbersome, and prone to human error.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

Figure 1:
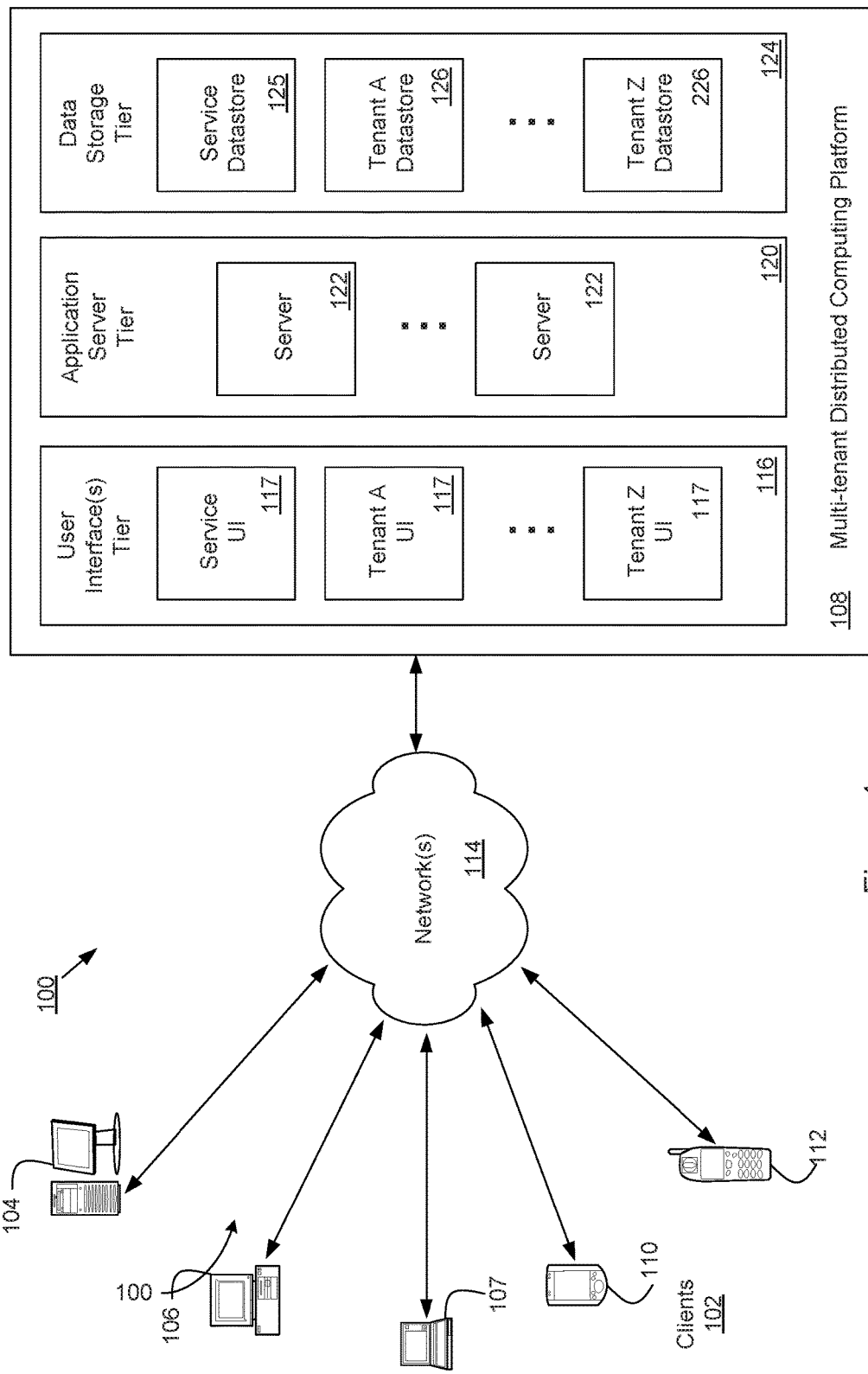
FIG. 1 is a diagram illustrating elements or components of an example operating environment in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the subject matter may be implemented in the context of a multi-tenant, "cloud" based environment (such as a multi-tenant business data processing platform), typically used to develop and provide web services and business applications for end users. This exemplary implementation environment will be described with reference to FIGS. 1-5 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

By way of overview, various embodiments as discussed herein are directed to systems, apparatuses, and methods for establishing a revenue arrangement mechanism for creating and handling revenue arrangement designed to allocate revenue according to accounting rules and procedures for handling revenue. These aspects of a revenue arrangement enable a business to more flexibly and accurately recognize revenue in a manner that complies with applicable accounting regulations and rules. In some embodiments, the methods and systems may be implemented as part of a business data processing platform that is used in conjunction with ERP, eCommerce, and/or CRM data as part of a multi-tenant system for providing order management and order processing services to one or more businesses. Such a platform may also be responsible for accessing and processing revenue, profit, inventory, sales, and other data in order to generate financial metrics that characterize the business(es) and their operations. This may be done (at least in part) for purposes of compliance with regulations or rules in the areas of securities, taxation, or financial reporting.

Revenue arrangements provide a benefit of time savings by enabling a rule-based approach to triggering the start of amortization or other revenue recognition operations. Further, use of automated revenue arrangements lead to reduced risk of missing opportunity to recognize revenue resulting from manual processes and provides an elegant way for events occurring external to the data processing platform to trigger recognition commencement through the definition and operation of custom platform objects. Revenue is one of (or may be) the most important financial statement measure considered for both preparers and users of financial statements. Revenue may be used to measure and assess aspects of an entity's past financial performance, future prospects, and general financial health. Hence an organization or enterprise needs to ensure the accurate and timely recognition/processing of revenue, the process of which is subject to multiple accounting standards/guidance (e.g., US GAAP and IFRS).

Other benefits include (a) removing inconsistencies and weaknesses in existing revenue recognition standards, (b) providing a robust revenue recognition frame work to support new business models, and (c) improving the ability to conduct financial comparisons across verticals in a manner that satisfies the requirements of various accounting boards (FASB and IFRS) and convergence of accounting standards. Embodiments of the inventive system and methods solve problems with conventional approaches by automating the revenue recognition and allocation process end-to-end using an integrated business data processing platform. This enables users to perform all of the steps/operations within the system, thereby increasing the efficiency, accuracy and auditability of the resulting schedules and calculations. Additionally, this will help accountants close the books on time while being able to reconcile more quickly because of a reduced number of manual transactions. This also helps accountants to provide all the supporting information during an audit, with that information extracted directly from the data processing platform via reports or saved searches, and the like.

Figure 2:
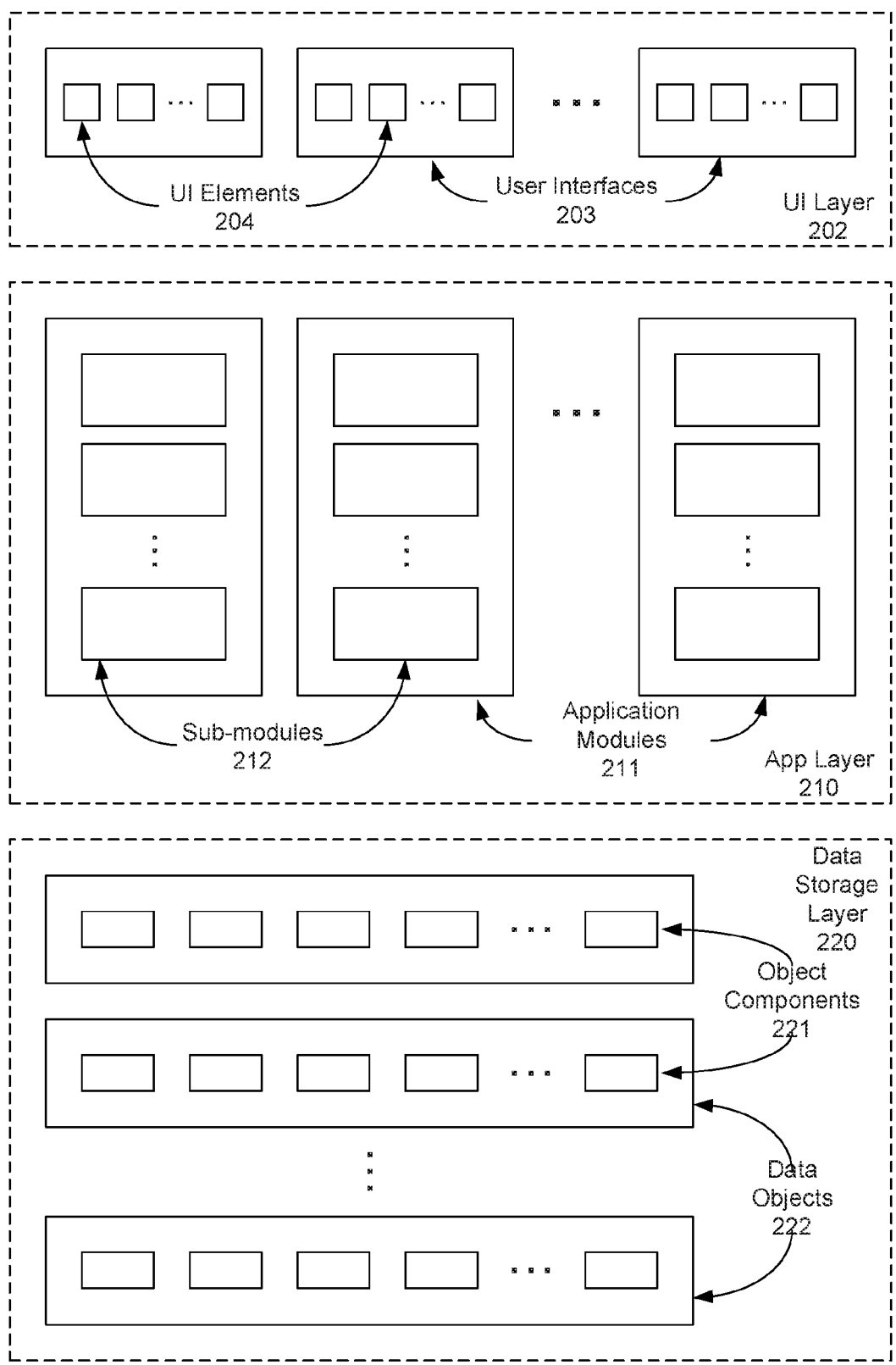
FIG. 2 is a diagram illustrating additional details of the elements or components of the multi-tenant distributed computing service platform of FIG. 1, in which an embodiment of the subject matter disclosed herein may be implemented.
Figure 3:
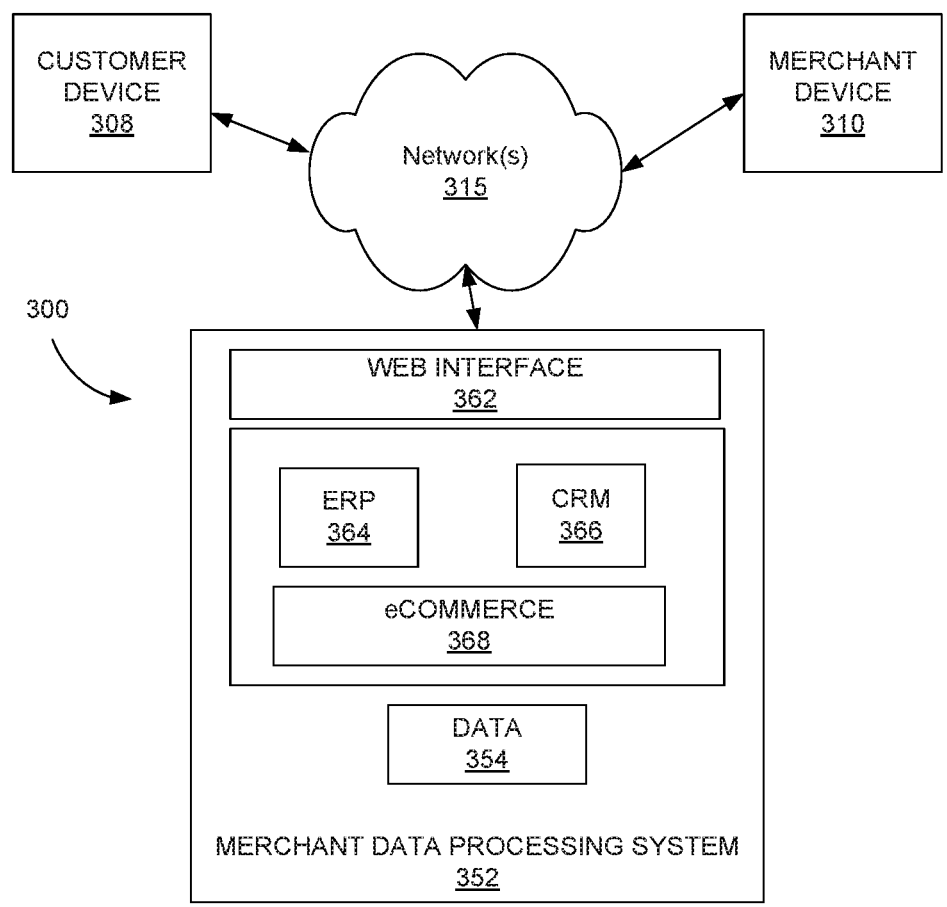
FIG. 3 is a diagram illustrating a simplified system of FIG. 1, including an integrated business system and an enterprise network in which an embodiment of the subject matter disclosed herein may be implemented.

Other objects and advantages will be apparent to one of ordinary skill in the art upon review of the detailed description and the included figures. Prior to discussing the embodiments, FIGS. 1-3 are presented to show an exemplary computing environment in which one or more embodiments may be practiced and realized.

FIG. 1 is a diagram illustrating elements or components of an example operating environment in which an embodiment may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment, the distributed computing service/platform 108 may be a multi-tenant and service platform 108 and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. However, one challenge in such multi-tenant platforms is the ability for each tenant to tailor their instantiation of the integrated business system to their specific business needs. In one embodiment, this limitation may be addressed by abstracting the modifications away from the codebase and instead supporting such increased functionality through custom transactions as part of the application itself. Prior to discussing additional aspects of custom transactions, additional aspects of the various computing systems and platforms are discussed next with respect to FIG. 2.

FIG. 2 is a diagram illustrating additional details of the elements or components of the distributed computing service platform of FIG. 1, in which an embodiment may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the multi-tenant distributed computing service platform of FIG. 1 are shown, in which an embodiment may be implemented. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 210 may include one or more application modules 211, each having one or more sub-modules 212. Each application module 211 or sub-module 212 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

establishing a revenue arrangement methodology for tracking various events and elements of a sale so that revenue may be recognized according to accounting rules and procedures;

establishing a protocol for generating and approving one or more revenue arrangements; and establishing a protocol for handling trackable events and elements such that one or more specific actions are triggered when one or more trackable events or elements has been accomplished.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 2) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

FIG. 3 is a diagram illustrating another perspective of a computing or data processing environment 300 in which an embodiment may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications that provide services and functionality to customers or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a database) that can be accessed remotely over a network. Although further examples below may reference the example computing environment depicted in FIGS. 1-3, it will be apparent to one of skill in the art that the examples may be adapted for alternate computing devices, systems, and environments.

As described herein, one or more of the functions, operations, processes, or methods used to implement an embodiment may be provided by an extension to an existing application, process, function, operation, and the like. In such an implementation, aspects of the inventive display may be provided as an extension to the operations of a multi-tenant business data processing platform or other suitable data processing system. These embodiments are illustrated via the flow diagrams of FIGS. 4a-4c next.

Figure 4A:
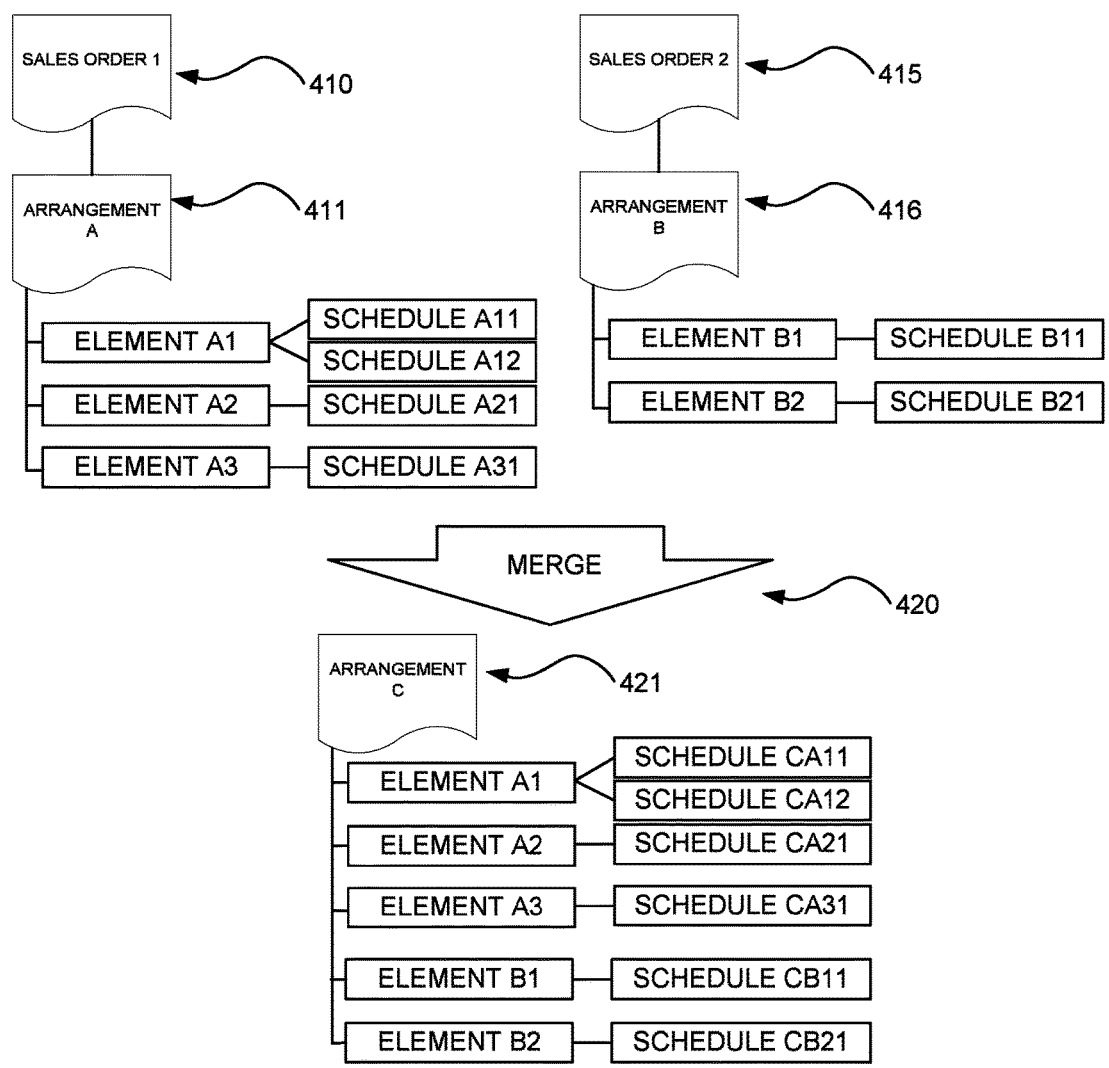
FIG. 4a is a flow chart or flow diagram illustrating a process, method, operation, or function that may be used when creating a revenue arrangement according to an embodiment of the subject matter disclosed herein.

FIG. 4a is a flow chart or flow diagram illustrating a process, method, operation, or function that may be used when creating a revenue arrangement according to an embodiment of the subject matter disclosed herein. In this flow chart two different sales 410 and 415 may be associated with two distinct revenue arrangements 411 and 416. FIG. 4a goes on to show how revenue arrangements 411 and 416 may be merged 420 such that a third revenue arrangement 421 may also be created to govern revenue recognition. However, the various embodiments of the subject matter discussed herein may be any combination of revenue arrangements as shown here.

A revenue arrangement 411, 416, and 420 is a concept known to revenue accountants and is functional in nature as the arrangement deals with how revenue is recognized in response to various events such as a fulfilment of a sales order or accomplishing a task. A revenue arrangement may sometimes be referred to as a multi-element arrangement. In one example, such as the revenue arrangement 411 or 416, splitting a single sale from a customer into multiple sales or elements is possible depending upon the number or types of items from the original sale that have been fulfilled may provide a way to more efficiently track the processing of the order. In another example multiple sales (from a single customer), such as the revenue arrangement 411 and 416, may be merged to more accurately recognize or allocate the revenue generated from a related set of sales or a specific task or project. One goal of embodiments of the system and methods discussed herein is to support the accounting standards that may require that revenue recognition depicts the transfer of promised goods or services to customers in an amount that reflects the consideration the entity expects to be entitled in exchange for those goods or services.

Therefore, a single large sale may not easily be used to show revenue recognition based on various factors, such as deliverables, services, milestones, time frames, and target goals. By introducing a revenue arrangement in conjunction with one or more sales, the overall revenue may be subdivided into allocable portions for associations with various elements of any specific sale. Such allocable portions may be arranged with regard to revenue source (e.g., sales, orders, subscriptions, projects, and the like), multi-currency transactions, multi-national transactions, billed and unbilled receivables or any other delineation available of when revenue may be recognized. Thus, a first sale 410 may undergo a revenue arrangement 411 in order to determine specific elements of the first sale, such as element A1, element A2 and element A3. Likewise, a second sale 415 may undergo a revenue arrangement 416 in order to determine specific elements of the second sale, such as element B1 and element B2.

For example, the first sale 410 may be a purchase of a specific manufactured good to be placed into service by a customer, such as an excavator. As the revenue generated by building and selling an excavator may be complicated, the entire sale may be broken down into trackable elements, such as element A1 for delivery of the excavator, element A2 for services associated with training on the excavator, and element A3 for maintenance of the excavator. Once these elements are determined, the revenue arrangement may further dictate a schedule of revenue recognition based on the fulfillment of these elements. Continuing this example, schedule A11 may be an amount of revenue recognized at the outset of delivering the excavator. Once delivered, event A12 may recognize an additional amount of revenue once initial training associated with the customer using the delivered excavator. A third trackable element A21 may be the ongoing training of new employees for the customer. Lastly, a fourth trackable element A31 may be related to services for maintenance on the delivered excavator wherein a fourth portion of revenue is recognized after the maintenance periods of time are complete.

Revenue recognition standards define and outline what portions of revenue can be recognized and under what conditions. Each sale may be associated with a total expected revenue amount at the outset. The timing of revenue recognition may be arranged in a revenue arrangement to track with specific elements. A trackable element may be a great number of events such as a "deliverable" for an order, an item fulfillment, completion of a milestone, execution of a contract, the passage of a time frame (e.g., reaching a due date or the end of a warranty period) or anything else related to a good or a service that will be provided to a customer (and either directly or indirectly).

Any sale may also be linked with additional sales in a merged sale revenue arrangement. Thus, arrangements generated off of sale 410 and sale 415 may be combined in one revenue arrangement 421 such that the elements of both sales 410 and 415 are then scheduled according to revenue arrangement 421 as shown. Providing this flexibility enables enterprises to accurately recognize revenue within or across sale (or any planned event) based on configurable trackable event based management (e.g., trackable event). Any of these trackable events may then trigger commencement of amortization or other revenue recognition operation by the system. These triggered actions are discussed further below with respect to FIG. 4c. Prior to discussing triggered events, the method for initiating a revenue arrangement is discussed next with respect to FIG. 4b.

Figure 4B:
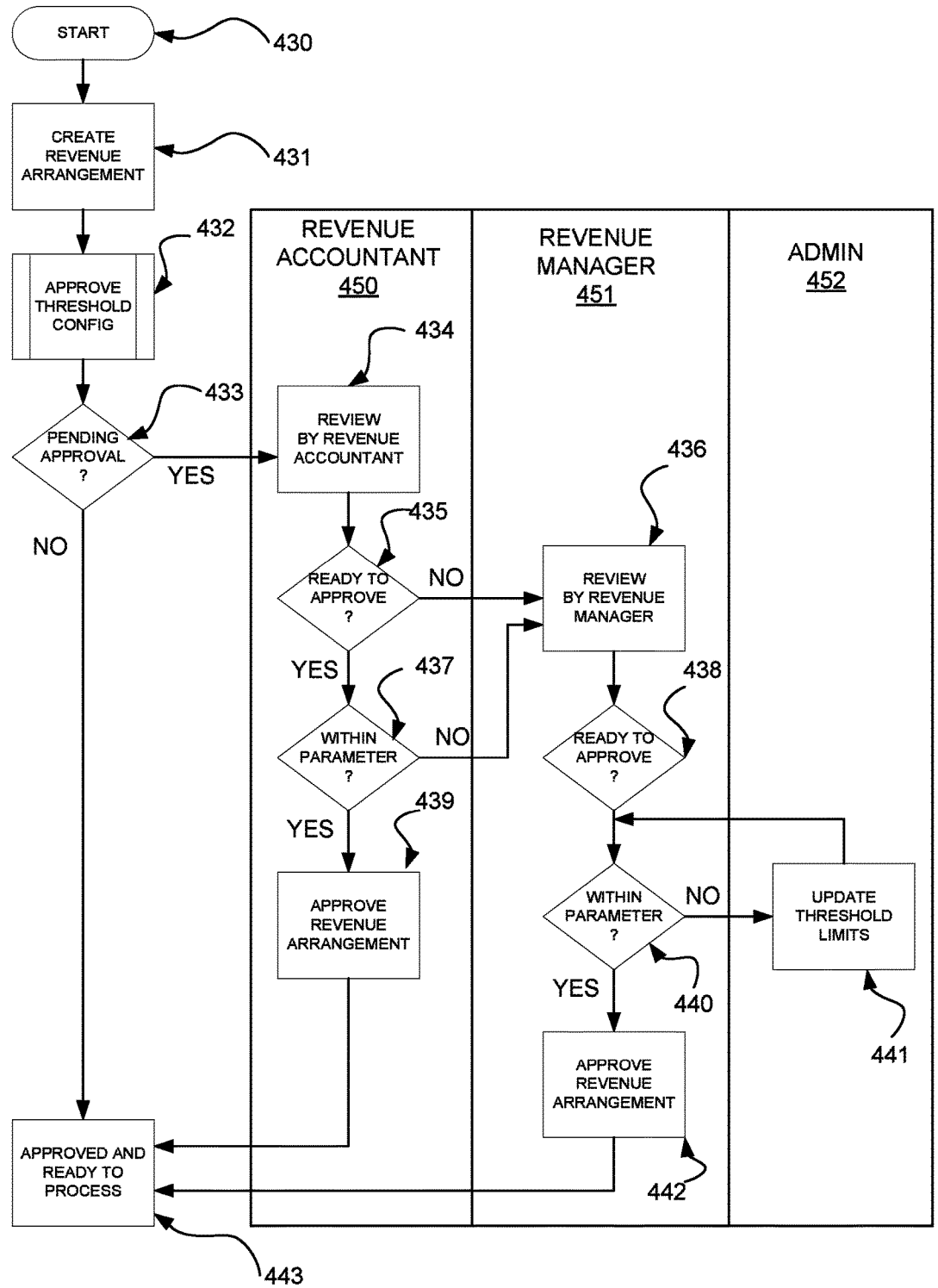
FIG. 4b is a flow chart or flow diagram illustrating a process, method, operation, or function that may be used when initiating a revenue arrangement according to an embodiment of the subject matter disclosed herein.

FIG. 4b is a flow chart or flow diagram illustrating a process, method, operation, or function that may be used when initiating a revenue arrangement according to an embodiment of the subject matter disclosed herein. As a revenue arrangement is established, one or more managers or accountants may be asked to provide input, authorization, or approval. Thus, in the flow chart of FIG. 4b, any credentialed user may initiate the creation of a revenue arrangement, but specific users with specific credentials may be involved further.

The system for revenue arrangement creation includes data displays and notifications in the form of a dashboard or other graphical user interface that support role based content. In this embodiment, two specific user roles in revenue management may be used in the creation and handling of a revenue arrangements. These two roles are (1) a revenue accountant 450 and (2) a revenue manager 451. Other custom roles may also be designed to have privilege to create and handle revenue arrangements. Further, any user who has administrative privileges in the system may further have an administrative role 452. These revenue arrangement dashboards become useful to a daily routine for a revenue accountant 450 or revenue manager 451 because the system pushes the role specific, actionable information to these dashboards. This provides efficiency in that the revenue accountant 450 and the revenue manager 451 do not to seek out specific items or actions for review and approval, but rather can spend time directly attending to the various issues. Also, the respective dashboard provides information on the revenue arrangements waiting for approval based on a seeded approval flow.

With such automated communication protocols in place, the overall revenue arrangement creation process may begin at step 430 when a sales document is created with one or more trackable events or trackable elements. Upon approval of the sales document (by a sales manager or other manager including one of the revenue manager and the revenue accountant), a backend process initiates the revenue arrangement creation step 431. This step includes three separate sub-processes: (1) revenue element generation, and (2) revenue arrangement creation, and (3) revenue plan creation. The revenue element generation process may inspect a specific sales order to determine trackable events or elements associated with the sales document. In this sub-process, milestones, deliverables, dates and the like may all be assimilated and arranged into specific trackable elements. In one embodiment, the revenue element generation is accomplished based on one or more data points entered when the sales document was created. In other embodiments, previously assembled data is used to determine the trackable elements from similar previous sales documents. Once the trackable elements are identified, a revenue arrangement is created. That is, specific portions of the overall revenue from the sales document are allocated to each trackable element such that that sum total of the allocated portions equals the overall revenue for the sales document. Once one or more revenue arrangements are created a revenue plan may be created.

At step 432, one or more thresholds may be assigned to the one or more trackable elements. Each threshold may be a specific amount or percentage of revenue allowed for any one trackable event. Further each threshold may have an association with a specific user or user role. For example, a first trackable event threshold may be 20% for any user, but may be 30% for a revenue accountant and may further be 40% for a revenue manager. In this manner, various approval levels for revenue arrangements that may exceed thresholds at various approval levels allow for more flexible revenue planning. Thus, once approval thresholds are configured, the method moves to decision step 433 where the lowest user-level threshold is checked for each revenue portion assigned to each trackable element. If no portion exceeds the lowest user-level threshold, the revenue arrangement may be approved at step 443 for use without any further approval from any revenue accountant 450 or revenue manager 451.

If, however, the lowest user-role threshold is exceeded by any revenue portion allocated in the revenue arrangement, the method pushes a communication to a dashboard of the next level-up user, the revenue accountant at step 434. The revenue accountant may disapprove altogether of the particular revenue arrangement in which case a NO decision at step 435 ends the method. If the revenue accountant is ready to approve the revenue arrangement, then the decision step 435 proceeds to the next step 437 for checking against the established threshold parameters initially configured. If within these parameters, the revenue arrangement is approved at step 439 and the revenue arrangement is approved for implementation at step 443.

If, however, the revenue accountant does not approve the revenue arraignment at decision step 435 or if the allocation of revenue is not within the initially set parameters, the method may move to step 436 where a communication is pushed to a dashboard of the next level-up user, the revenue manager. The revenue manager may disapprove altogether of the particular revenue arrangement in which case a NO decision at step 438 ends the method. If the revenue manager is ready to approve the revenue arrangement, then the decision step 438 proceeds to the next step 440 for checking against the established threshold parameters initially configured. If within these parameters, the revenue arrangement is approved at step 442 and the revenue arrangement is approved for implementation at step 443.

At step 440, if the planned allocation of revenue is still not within the initially set parameters, then the method may notify an administrator to adjust the parameters at step 441. After the adjustment, the method returns to the approval decision step 438 for the revenue manager. Once the revenue arrangement is created and approved, various trackable events may trigger one or more actions with respect to revenue recognitions and other actions that are related. The next paragraphs discuss these triggered actions in the context of a revenue arrangement.

Figure 4C:
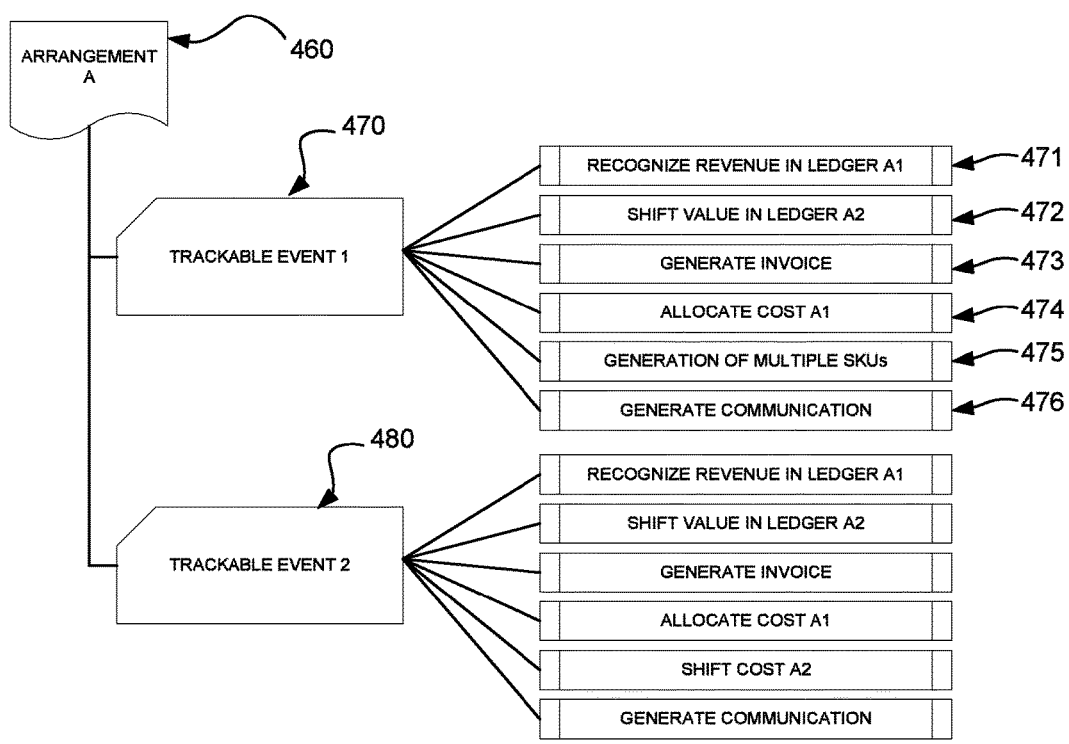
FIG. 4c is a flow chart or flow diagram illustrating a process, method, operation, or function that may be used when handling a revenue arrangement according to an embodiment of the subject matter disclosed herein.

FIG. 4c is a flow chart or flow diagram illustrating a process, method, operation, or function that may be used when handling a revenue arrangement according to an embodiment of the subject matter disclosed herein. In the example embodiment, a first revenue arrangement 460 may be established and may have a number of trackable events. In FIG. 4c, only two trackable events 470 and 480 are shown for ease of illustration. Further, each trackable event 470 and 480 is shown as having six triggered actions as a result of fulfillment of the trackable event. This, again, is for ease of illustration in that a trackable event may trigger only one or two actions, but any number is possible depending on the trackable event. As such, these examples show six each and also show the same six triggered actions, again for ease of illustration.

When the first trackable event 470 is fulfilled, this embodiment shows six different actions being triggered. The first triggered event 471 may be a recognition of revenue in a first ledger A1. Such a triggering may be predicated upon a seller contingency such as delivery of a good or performance of a service. Contingencies are a seller's contractual obligations that need to be completed or fulfilled before revenue can be recognized. As discussed above, the functionality is provided to automatically assign such contingencies (using user configurable rules) to the revenue arrangements so that revenue is deferred until those contingencies are completed or fulfilled. Additionally, these rules also provide the flexibility to configure the contingency removal events for each contingency, enabling the complete automation of the end-to-end process.

The second triggered event 472 may be an entry in another ledger A2 in the context of a multi-book system. The system supports multiple general ledger (GL) books to enable the user to maintain one or more of country specific accounting needs, enable consolidation of subsidiary accounts, or achieve the elimination of Intercompany journals, and the like.

The third triggered action 473 may be a communication to an invoicing engine for generating an invoice corresponding to the fulfillment of the trackable event. The invoicing engine may then, in turn, generate a physical invoice to be mailed to a customer or may be an electronic communication notifying a customer that payment is now due or that a triggered payment has been invoked. As but one example, a seller may have established a pay account, such as a credit card, for monthly payment of a service fee. Then, after the passage of a specified time (e.g., one month), the fulfillment of this trackable event will trigger a charge to the credit card and may also trigger an entry in a general ledger recognizing income at the same time.

The fourth triggered event 474 may be the allocation of a cost when the trackable event is accomplished. Deferring a cost requirement in the revenue arrangement allows a seller to consider some of the costs incurred to obtain/fulfill a sales contract as capitalized in order to amortize over a certain period of time. Due to accounting regulation ambiguity and/or uncertainty, the following aspects of the process may be automated or not, or automated but allowed to be "turned off" as part of the larger overall process. In an embodiment, the triggered action may be to (1) identify how much cost should be immediately recognized vs. amortized and to (2) identify how to "allocate" deferred cost across multiple trackable elements (similar to revenue allocation). Then, (3) identify the actual start/end date of deferred cost amortization, or its amortization pattern. Other aspects that may be automated (and typically are) include using an accounting preference for enabling cost deferral.

A fifth triggered event 475 may be an auto expansion of single SKU into multiple SKUs. Thus, if a buyer signs a contract on a sale to receive a package deal for products, training and service, the triggered event may be to create a separate trackable SKU for each of (1) the products, (2) the training and (3) the service. The system may provide for the automated expansion of a single SKU to multiple SKU(s) for more accurate and flexible revenue management. As an example, on a sale one may see only a single item (for example, a SaaS Subscription). But, this may represent two revenue generating events, such as (1) SaaS service and (2) support. As a result, the revenue may be recognized separately for these items. Hence during the revenue arrangement process, the single SKU (SaaS subscription) may be further differentiated into two separate SKU (Elements), SaaS and support.

A sixth triggered event 476 may be the generating of a communication to one or more users or managers. If a trackable event has been accomplished, then, in addition to recognizing some revenue, an electronic communication may be sent to a manager having a dashboard.

Figure 5:
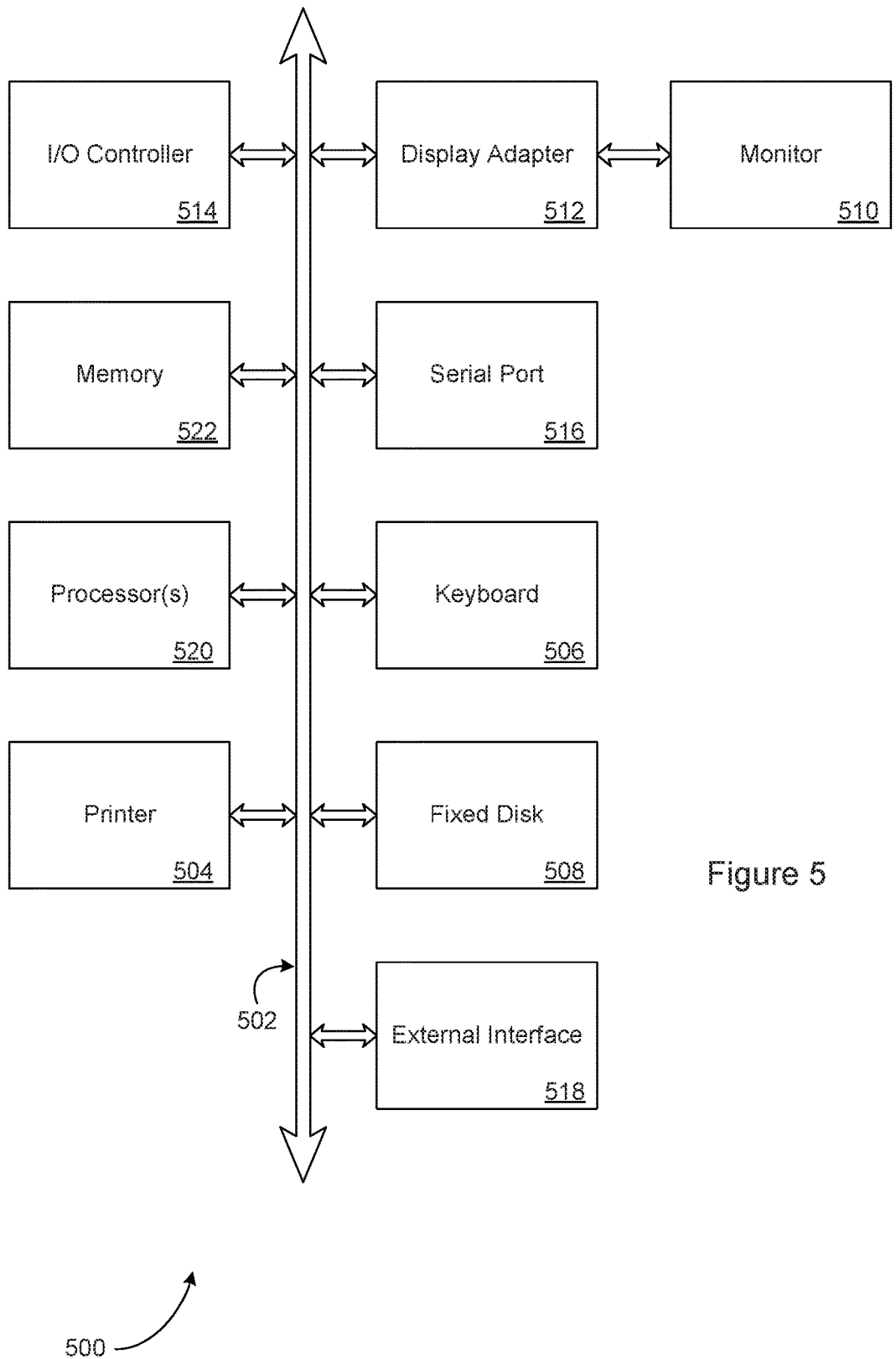
FIG. 5 is a diagram illustrating elements or components that may be present in a computer device or system configured to implement a method, process, function, or operation in accordance with an embodiment.

In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 600 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method performed by at least a computing system in an enterprise resource management computing platform comprising at least one processor and memory, the method comprising:
   generating and displaying a graphical user interface on a display for creating a revenue arrangement comprising a plurality of input parameters, comprising:
   creating a sales document in the memory that defines an overall revenue;
   inspecting, by at least the processor, the sales document from the memory to determine a plurality of trackable events associated with the sales document;
   associating, via the graphical user interface, one or more actions to each of the trackable events that are triggered when the trackable event is fulfilled;
   subdividing, by at least the processor and storing into the memory, the overall revenue from the sales document into subdivided portions by allocating different portions to each of the trackable events, wherein a sum of the different portions allocated equals the overall revenue;
   assigning, by at least the processor, one or more thresholds to each of the trackable events in response to an input via the graphical user interface, wherein each threshold defines an amount of revenue allowed for any one of the trackable events and is stored in the memory;
   associating one or more of the thresholds to different user-level thresholds that define different threshold amounts for a corresponding trackable event based on a user role;
   after the different user-level thresholds are associated, identifying and checking whether any of the subdivided portions of the overall revenue exceed a lowest user-level threshold from the different user-level thresholds, wherein the identifying and checking is performed by at least the processor accessing and reading values of the different user-level thresholds from the memory;
   when no subdivided portion exceeds the lowest user-level threshold as determined by the processor during the checking, then the processor generates an approval of the revenue arrangement via the graphical user interface; and
   when the lowest user-role threshold is exceeded by any of the subdivided portions as determined by the processor during the checking, then the processor pushes a communication to a user interface dashboard associated with a defined user, wherein the communication requests an input for approving or disapproving the revenue arrangement.

2. The method of claim 1, further comprising generating an invoice having the subdivided portion of the overall revenue due that corresponds to one or more of the plurality of the trackable events that has been fulfilled.

3. The method of claim 1, wherein one of the trackable events is defined as delivery of a good to a customer.

4. The method of claim 1, wherein one of the trackable events is defined as performance of a service for a customer.

5. The method of claim 1, wherein one of the trackable events is defined as passage of a specified amount of time with respect to when the sales document was received.

6. The method of claim 1, wherein one of the trackable events is defined as execution of a contract with a customer.

7. The method of claim 1, wherein one of the trackable events is defined as reaching a milestone with respect to the sale.

8. The method of claim 1, further comprising updating a secondary book in response to the receiving the sale document.

9. The method of claim 1, further comprising:
   sending a communication to a manager after determining the plurality of trackable events associated with the sale document; and
   receiving an approval from the manager prior to assigning the subdivided portion of the revenue to each trackable event.

10. The method of claim 1, further comprising:
    determining a cost associated with the sale document; and
    assigning a portion of the cost to each trackable event and storing the cost assignment in the memory.

11. A multi-tenant computing platform, comprising:
    one or more processors connected to at least one memory and configured to execute instructions;

one or more memory modules coupled to the one or more processors and configured to store computer-executable instructions that, when executed by the one or more processors, cause the one or more processors to:

generate and display a graphical user interface on a display for creating a revenue arrangement comprising a plurality of input parameters, comprising:

create a sales document in the memory that defines an overall revenue;

inspect, by at least the processor, the sales document from the memory to determine a plurality of trackable events associated with the sales document;

associate, via the graphical user interface, one or more actions to each of the trackable events that are triggered when the trackable event is fulfilled;

subdivide, by at least the processor and storing into the memory, the overall revenue from the sales document into subdivided portions by allocating different portions to each of the trackable events, wherein a sum of the different portions allocated equals the overall revenue;

assign, by at least the processor, one or more thresholds to each of the trackable events in response to an input via the graphical user interface, wherein each threshold defines an amount of revenue allowed for any one of the trackable events and is stored in the memory;

associate one or more of the thresholds to different user-level thresholds that define different threshold amounts for a corresponding trackable event based on a user role;

after the different user-level thresholds are associated, identify and check whether any of the subdivided portions of the overall revenue exceed a lowest user-level threshold from the different user-level thresholds, wherein the identifying and checking is performed by at least the processor accessing and reading values of the different user-level thresholds from the memory;

when no subdivided portion exceeds the lowest user-level threshold as determined by the processor during the checking, then the processor generates an approval of the revenue arrangement via the graphical user interface; and when the lowest user-role threshold is exceeded by any of the subdivided portions as determined by the processor during the checking, then the processor pushes a communication to a user interface dashboard associated with a defined user, wherein the communication requests an input for approving or disapproving the revenue arrangement.

12. The multi-tenant computing platform of claim 11, further comprising instructions stored in the memory for:

tracking the overall revenue in a log as not earned when a sale from the sale document is received;

receiving an input indicating that one or more of the plurality of trackable events has been accomplished; and updating the log corresponding to the portion of the revenue assigned to the one or more of the plurality of the trackable event that has been accomplished.

13. The multi-tenant computing platform of claim 11, further comprising an inventory module coupled to the one or more processors and configured to be updated in response to receiving the input indicating that one or more of the plurality of trackable events has been accomplished.

14. The multi-tenant computing platform of claim 11, further comprising a communication module coupled to the one or more processors and configured to generate an electronic communication to a computer associated with a manager in response to receiving the input indicating that one or more of the plurality of trackable events has been accomplished.

15. The multi-tenant computing platform of claim 11, further comprising a multi-book management module coupled to the one or more processors and configured to update a plurality of books in response to receiving the input indicating that one or more of the plurality of trackable events has been accomplished.

16. The multi-tenant computing platform of claim 11, further comprising a cost tracking module coupled to the one or more processors and configured to associate a cost with a received sale such that the cost is divided into portions that each correspond with one of the plurality of trackable events.

17. The multi-tenant computing platform of claim 11, wherein the trackable event comprises one of the group comprised of: delivery of a good, performance of a service, elapsing of a time frame; execution of a contract; reaching of a milestone.

* * * * *